United States Patent [19]

Swanson

[11] Patent Number: 4,856,821

[45] Date of Patent: Aug. 15, 1989

[54] HOSE COUPLING

[76] Inventor: Arthur P. Swanson, 1454 Estate La., Glenview, Ill. 60025

[21] Appl. No.: 251,296

[22] Filed: Sep. 30, 1988

[51] Int. Cl.$^4$ .............................................. F16L 35/00
[52] U.S. Cl. ...................................... 285/24; 246/257; 246/8; 246/354
[58] Field of Search .................... 285/24, 8, 27, 246, 285/247, 257, 353, 354

[56] References Cited

U.S. PATENT DOCUMENTS

| | | | |
|---|---|---|---|
| 494,918 | 4/1893 | Evans | 285/27 |
| 599,244 | 2/1898 | Decarie | 285/27 |
| 3,108,825 | 10/1963 | MacDonald | 285/354 X |
| 4,030,778 | 6/1977 | Kaut | 285/354 |
| 4,079,966 | 3/1978 | Berry et al. | 285/24 |
| 4,508,367 | 4/1985 | Oreopoulos et al. | 285/24 X |
| 4,775,170 | 10/1988 | Usui et al. | 285/24 |

OTHER PUBLICATIONS 2 sheets of photographic reproductions of conventional hose couplings.

Primary Examiner—Dave W. Arola
Attorney, Agent, or Firm—Hill, Van Santen, Steadman & Simpson

[57] ABSTRACT

Couplings for hoses and the like having externally threaded male components and internally threaded female components provided with tube inserts projecting from one component into slide fit engagement with the other component for aligning the threaded portions of the components as they are brought together for threaded engagement. To further facilitate alignment of the components, the internally threaded female component has an unthreaded smooth extension for sliding over the externally threaded male component to align the thread. The tubular extension member may be a separate auxiliary tube bottomed in the female coupling unit and held in position by a resilient washer, such as is conventionally used between the coupling units. Alternately the tubular extension may be a fixed part of one of the coupling components. The extension tube and the extended smooth leading end of the internally threaded female member can be used together or separately.

8 Claims, 1 Drawing Sheet

HOSE COUPLING

FIELD OF THE INVENTION

This invention relates to the coupling art and more particularly to hose couplings with externally threaded male components and internally threaded female components wherein the components are equipped with guiding devices for aligning the threads into mating relationship.

BACKGROUND OF THE INVENTION

Conventional hose couplings have an externally threaded male component sealingly connected to an end of one hose and a female component sealingly connected to the end of a second hose carrying an internally threaded rotatable collar receiving the male component in threaded engagement to draw the end of the male component into tight sealing engagement with a resilient washer bottomed in the female component. Alignment of the male and female components for threaded engagement requires patience and skill to bring the external threads of the male component into threaded engagement with the internal threads of the female component.

It would therefore be an improvement in this art to provide aligning devices for threaded couplings, especially hose couplings, which will automatically align the threads for mating engagement as the components are brought together. It would be a further improvement in this art to provide an extension tube on one of the components for sliding engagement with the other component to align the threads of both components and it would be a still further improvement to provide a smooth internal wall projection on the female component to slide over the external threads of the male component for feeding these threads into the internal threads of the female component.

Still further improvements include the provision of the extension tube as an accessory for conventional couplings which is held in position in the female coupling by the conventional resilient washer used with such couplings.

SUMMARY OF THE INVENTION

According to this invention, couplings for tubing, such as hoses and the like, are provided with self aligning structures which will automatically bring the coupling components into mated relationship as they are brought together for connection.

While the invention will be hereinafter described as embodied in conventional threaded together garden hose couplings it will, of course, be understood that the principles of the invention are useful with all types of couplings for tubular conduits, such as hoses and pipes.

In the preferred embodiments of the invention, a conventional garden hose coupling with an externally threaded male component sealingly connected to the end of one hose and an internally threaded component sealingly connected to the end of a second hose, is provided with a tubular extension projecting from one component into sliding engagement with the other component to automatically align the threads of both components as they are pushed together. This tubular extension can be integral with one of the components or provided as a separate auxiliary member bottomed in the female component and held in place by the conventional washer provided in garden hose couplings. The portion of the tube projecting from the female component slidably fits into the male component without obstructing flow through the coupling.

The preferred embodiments also include a smooth internal wall projection in advance of the internal threads in the female component for sliding over the external threads of the main component to guide the threads into mating engagement. This smooth wall extension may be used without the tube to align the internal threaded female component with the external threads of a faucet or the like which may not accept the extension tube.

The sheet of drawings of the application illustrates several best mode embodiments of the invention in which.

BRIEF DESCRIPTION OF THE ILLUSTRATED EMBODIMENTS

Figure 1:
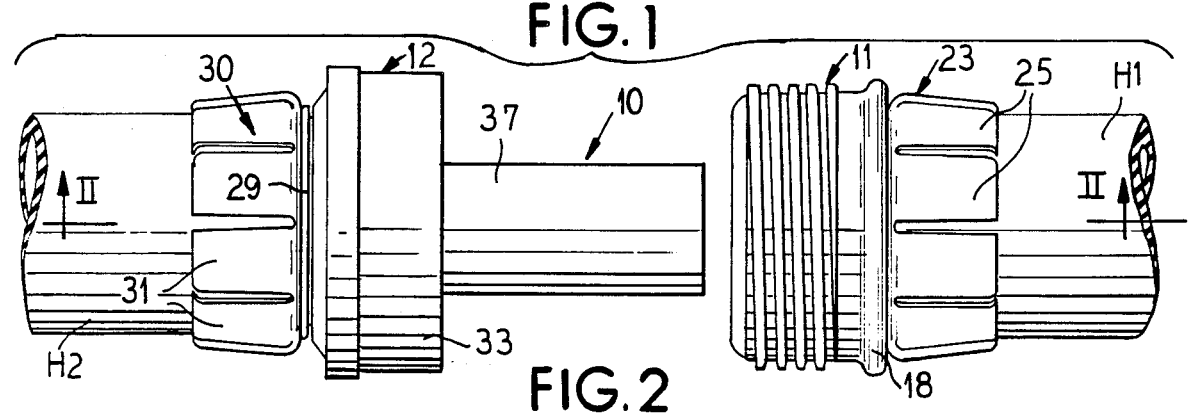
FIG. 1 is a side elevational view of a hose coupling with the components in uncoupled position and illustrating a tube extension on the female coupling component in position to enter the male coupling component.
Figure 2:
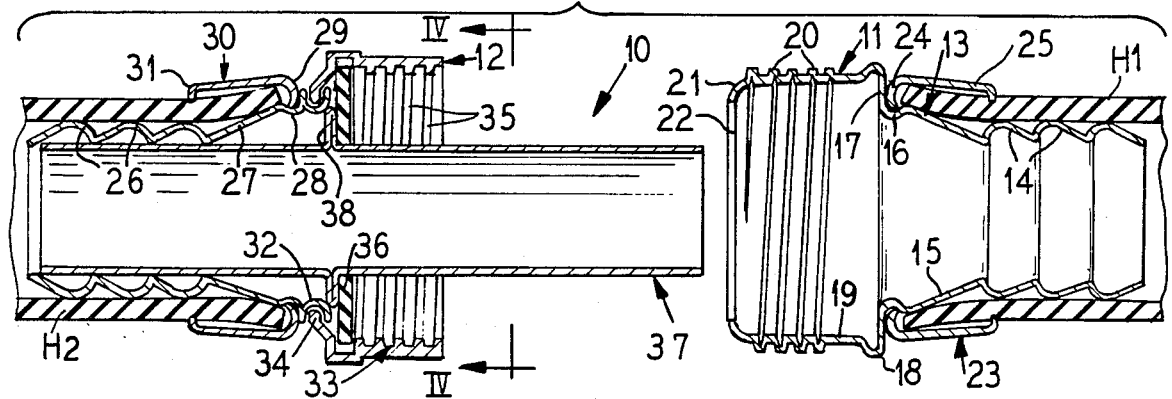
FIG. 2 is a longitudinal sectional view along the line II—II of FIG. 1.

In FIGS. 1-4 the reference numeral 10 designates generally a hose coupling composed of a male component 11 on the end of a first hose $H_1$ and a second component 12 on the end of a second hose $H_2$. These components 11 and 12 are of a conventional type for user attachment to the hose ends, but it should be understood that this invention is useful with coupling components sold as original equipment on garden hoses and the like.

As illustrated, the component 11 has a tubular body 13 preferably formed of brass with a reduced diameter externally beaded portion 14 tightly fitting the interior of the hose $H^1$ with an outwardly flaring conical portion 15 spreading the mouth of the hose and having an internal bead providing a peripheral groove 16 around the mouth of the conical portion 15. A radial wall 17 extends outwardly from the groove 16 to an external bead 18 from which projects a cylindrical portion 19 having external threads 20 therearound leading to an inwardly bevelled end 21 having a large diameter opening 22 therethrough.

A malleable metal collar 23 surrounds the conical portion 15 and has a leading end 24 pressed into the groove 16 in fixed engagement therewith. The collar 23 has a ring of circumferentially spaced prongs 25 projecting rearwardly from the portion 24 which are pressed into the groove 16. These prongs 25 fit over the hose $H_1$ and are pressed inwardly around the hose to force it into tightly gripped and fixed sealed relation with the coupling component 11.

The coupling component 12 has a similar brass body with an externally beaded cylindrical portion 26 tightly fitting into the end of the hose $H_2$ and leading to an outwardly flared cylindrical portion 27 spreading the hose outwardly into tight mated engagement therewith. The diverse end of this conical portion 27 has an internal bead providing a groove 28 receiving the inturned lip 29 of an malleable collar 30 with prongs 31 surrounding and biting into the periphery of the hose $H_2$. A second inturned bead defines a peripheral groove 32 in front of the groove 28. An internally threaded collar ring 33 has a lip 34 loosely seated in this peripheral groove 32 so that the ring 33 is freely rotatable around the groove. The ring 33 has a sufficiently large diameter to embrace the threaded portion of the male coupling 11 and has internal threads 35 for mating with the threads 20 of the male coupling.

A compressible washer 36 of the type conventionally used between the bead defining the groove 32 of the female component 12 and the inturned lip 21 of the male component 11 to tightly seal the components together when the ring 33 is threaded home on the male component is provided. However, according to this invention, this conventional washer 36 is removed from the female coupling component 12 and an alignment tube 37 of this invention receives the washer 36 therearound which is bottomed on an external peripheral shoulder 38 of the tube. The tube 37 is preferably formed of copper or brass and has an external circumference slidably fitting in the beaded portion 26 of the coupling body. The shoulder 38 may be conveniently formed by a circumferential bead around the tube 37 intermediate the ends of the tube and spaced from these ends to provide a sufficient length of the tube for fitting into the beaded end 26 of the coupling component 12 with a leading projection of sufficient length to extend beyond the rotatable ring 33, through the mouth 22 of the coupling component 11 into sliding engagement with the beaded portion 14 of the housing of the component 11 before the external threads 20 reach the internal threads 25 of the component 12.

The tube 37 with the washer 36 therearound is pushed into the body of the coupling component 12 to seat the shoulder 38 on the bead defining the groove 32 with the periphery of the washer extending radially beyond the shoulder.

Figure 3:
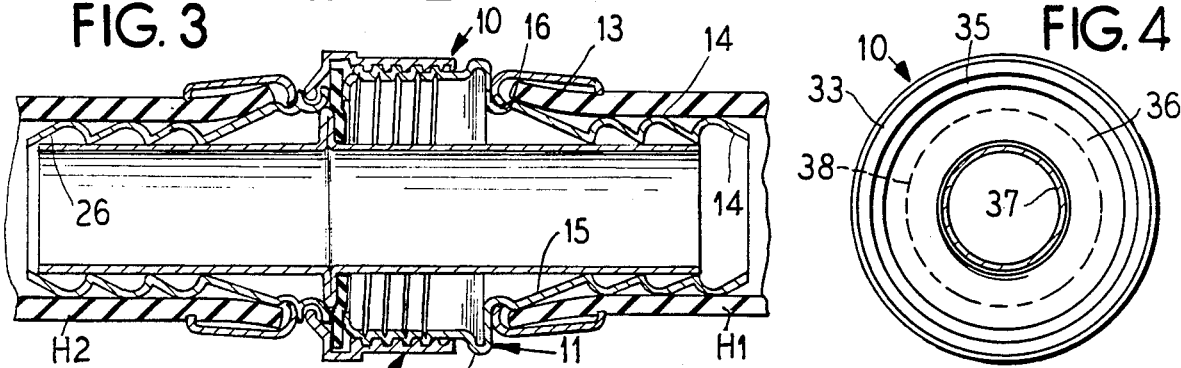
FIG. 3 is a longitudinal sectional view similar to FIG. 2 but showing the components in coupled engagement.
Figure 4:
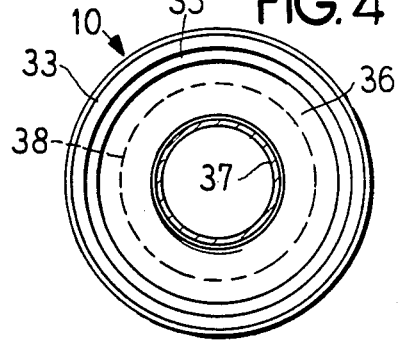
FIG. 4 is a transverse sectional view along the line IV—IV OF FIG. 2.
Figure 5:
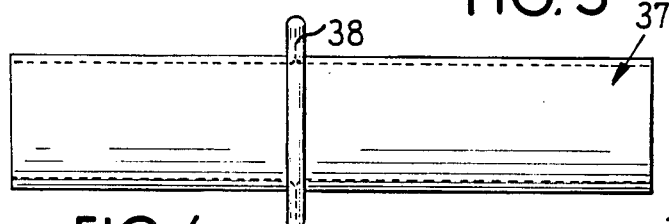
FIG. 5 is an elevational view of the alignment tube for the coupling of FIGS. 1-4.

When the coupling components on their respective hose ends $H_1$ and $H_2$ are pulled toward each other, the leading end of the tube 37 will freely enter the mouth 22, pass through the internally threaded cylindrical portion 19 and encounter the tapered wall portion 15 of the male coupling housing whereupon it is automatically guided into sliding engagement with the beaded portion 14 of the housing. This aligns the external threads 20 of the male component 11 with the internal threads 35 of the female component 12. Then, when the ring 33 is rotated, the threads will mate and draw the male component into the ring with its bevelled end 21 engaging the washer 36 and squeezing it between the end 21 and bead defining groove 32 as illustrated in FIG. 3. The hose ends $H_1$ and $H_2$ are thus coupled together in sealed end-to-end relationship. It will be noted that the tube 37 does not obstruct flow between the hoses $H_1$ and $H_2$.

The separate guide tube 37, illustrated in FIGS. 1-4, is especially useful with conventional hose couplings that are already on the market and it is easily applied to such couplings with the conventional compressible washer used therein.

Figure 6:
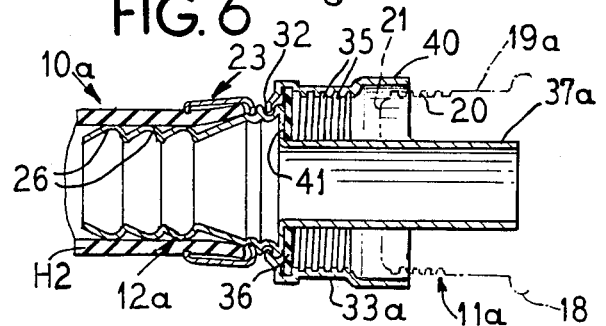
FIG. 6 is a sectional view of a modified coupling having an integral extension tube on the female coupling component and an unthreaded annular extension on the internally threaded ring to embrace the external threads of the male coupling and guide the threads into mating relation.

However, according to this invention, the guide tube may be formed integrally with the body of the female component. As shown in FIG. 6, a modified coupling 10a has the components thereof which are common with the components of the coupling 10 of FIGS. 1-4 marked with the same reference numerals. However, a modified alignment tube 37a is formed as an integral part of the body of the modified female coupling 12a. Also, a modified rotatable ring 33a on the modified body 12a has an unthreaded extension 40 on the leading end thereof. This extension has a smooth internal wall adapted to slide over the external threads 20 of the male coupling 11a and thus guide these threads into mated engagement with the internal thread 35. The male coupling 11a has an unthreaded portion 19a inwardly from the external threads 20 of sufficient length to receive this extension 40 thereover before it engages the bead 18.

A flange portion 41 on the inner end of the tube 37a internally connects the tube with the bead defining the groove 32 and the washer 36 is squeezed between this flange 41 and the inturned end 21 of the coupling component 11.

Figure 7:
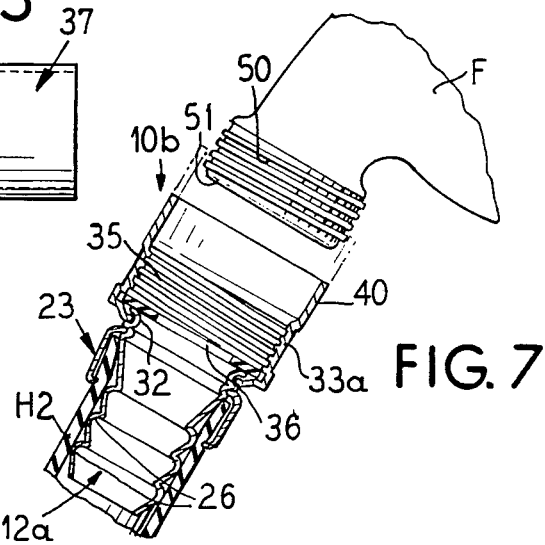
FIG. 7 is a longitudinal sectional view of a female coupling component of this invention without the tubular extension but illustrating the manner in which the extended annular portion of the internally threaded ring will slide over the external threads of a conventional faucet to bring the threads into mated relation

As illustrated in FIG. 7, a further modified coupling 10b is provided for mounting on the externally threaded mouth 50 of a conventional faucet F. In this arrangement 10b, the ring 33a of the coupling 10a with its smooth internal wall extension 40 slidably fits over the threads 50 to guide the internal threads 35 of the ring into alignment with the external threads of the faucet. However, the extension tube 37a of the coupling 10a is not used and the inturned lip 51 on the mouth of the faucet is squeezed on the washer 36 against the bead defining the groove 32 to seal the coupling 12a to the faucet F which is bottomed in the ring 33a.

From the above descriptions it should be clearly understood to those skilled in this art, that this invention provides substantial improvements in the coupling art to facilitate alignment of mating coupling components without obstructing passages through the coupling.

I claim as my invention:

1. A coupling for the ends of conduits for fluid flow without leakage through the conduits which comprises first and second tubular components each having an outboard extension for receiving said ends of the conduits therearound, said first coupling having an inner end with an external peripheral groove and an abutment surface, a collar having an end rotatably mounted in said peripheral groove receiving said inner end of the first component in the collar, said collar having an internally threaded sleeve portion projecting beyond said inner end of said first component, a tube slideably seated in the outboard extension end of said first component projecting beyond said collar, said tube having an external shoulder intermediate the ends thereof bottomed on said inner end abutment surface of the first component, a seal ring in said collar overlying said shoulder and inner end abutment surface of the first component, said second component having an externally threaded portion with an end abutment for engaging said seal ring when the collar is threaded onto the external threads thereof whereby the tube will project into the outboard end of the second coupling component and the seal ring will sealingly connect the shoulder of the tube with the inner end abutment surface of the first component for sealed fluid flow through the tube.

2. The coupling of claim 1, wherein the first coupling component has a portion diverging from the outboard end thereof to spread the conduit into tight sealing engagement therewith.

3. The coupling of claim 1, wherein the second component has a portion diverging from the outboard end thereof to spread the conduit into sealed engagement therewith.

4. The coupling of claim 1 including rings with circumferentially spaced bendable prongs surrounding the components for squeezing the ends of the conduits into sealed engagement with the components.

5. A coupling for conduits which comprises male and female tubular components each having an outboard extension for receiving therearound the ends of hoses to be coupled, an internally threaded collar and cooperating means on said collar and female component mounting said internally threaded on said female component and said internally threaded collar extending beyond the hose receiving extension thereof, said female component having an abutment surface on the end thereof adjacent said cooperating means, a resilient radial seal ring bottomed in said collar, said male coupling component having an externally threaded portion mating with the internal threads of the collar and having an end portion for abutting and thrusting against said resilient radial seal ring, a tube in said female coupling component projecting beyond the collar into a sliding fit relation with the interior of the male coupling to align the male and female coupling component for threaded engagement, and said tube having a radial shoulder covered by said resilient radial seal and bottomed on the abutment surface of female component whereby the end portion of the male component is pressed against the seal ring when the internal threads of the collar and the external threads of the male component are tightened together to secure the tube in the female component and to seal the coupling components together by urging the seal ring against said radial shoulder and abutment surface for a free sealed flow of fluid between the ends of the hoses receiving the outboard ends of the coupling components.

6. The coupling of claim 5, wherein the end portion of the male coupling member engaging the seal ring is an inturned lip.

7. A hose coupling which comprises male and female coupling members each having means for receiving and sealing therearound the ends of hose members, said female coupling member having an end portion with an abutment surface and internally threaded rotatable collar, a resilient radial seal ring bottomed in said collar, said male coupling member having an external threaded portion mating with the threads of the collar to draw the coupling parts together into sealed engagement with said radial seal ring, a tube in said female member projecting beyond the collar into a sliding fit relationship with the male member to align the male and female parts for threaded engagement, and said tube having an external shoulder abutted by said abutment surface and said seal ring abutting said abutment surface and said external shoulder to sealingly secure the tube in the female coupling when said male coupling member is threaded into said female coupling member.

8. The coupling of claim 7, wherein the tube also has a sliding fit relationship with the female coupling member.

* * * * *